United States Patent Office 3,525,599
Patented Aug. 25, 1970

3,525,599
BARIUM-CONTAINING DISPERSION
Gerald L. Nield, Ponca City, Okla., assignor to Continental Oil Co., Ponca City, Okla., a corporation of Delaware
No Drawing. Filed Oct. 25, 1967, Ser. No. 677,870
Int. Cl. C10l 1/22, 1/30, 1/32
U.S. Cl. 44—51                                25 Claims

ABSTRACT OF THE DISCLOSURE

Dispersion of barium carbonate in an amine salt of an oil-soluble organic acid, and process for the preparation of the same. Broadly stated, the process comprises:
(a) forming an admixture of an amine salt of an oil-soluble organic acid (e.g. sulfonic acid), basic barium compound, alcohol, and nonvolatile diluent oil,
(b) carbonating the admixture of step (a), and
(c) removing any volatile materials.
The product is particularly useful as a smoke suppressant additive in diesel fuels.

DISCLOSURE

Background

The present invention relates to a composition of matter comprising a dispersion of barium carbonate in an amine salt of an oil-soluble organic acid, said composition having an unusually high concentration of barium carbonate while still having a low viscosity. The composition is particularly useful as a smoke suppressant additive in diesel fuels.

Several methods are known for preparing oil-soluble dispersions of barium carbonate. A typical method of the prior art is that of Robert L. Carlyle in U.S. Pat. No. 2,861,951. The Carlyle method comprises:

(A) Admixing under atmospheric conditions of temperature and pressure:
(1) an oil-soluble dispersing agent and volatile solvent therefor,
(2) a nonvolatile carrier for the dispersing agent,
(3) an aliphatic alcohol solution of an oil-insoluble barium inorganic base wherein the anion of said base is selected from the group consisting of oxide and hydroxide radicals;

(B) Condensing from such mass at atmospheric pressure an oil-insoluble barium carbonate in particles, the diameter of which are less than .25 micron, by passing carbon dioxide through such mass to convert the inorganic base to carbonate;

(C) Removing the residual solvents and any water present.

Carlyle teaches that amine sulfonates may be used as the dispersing agent in his process. Carlyle, however, does not recognize that certain amine sulfonates provide several advantages over metal (e.g., barium) sulfonates in preparing barium carbonate dispersions. Some of these advantages are:

(1) the use of an amine sulfonate produces a product which is markedly superior when used as a smoke suppressant additive in diesel fuels,
(2) the use of an amine sulfonate results in a product containing a larger amounts of dispersed barium carbonate.

Moreover, we have found that the combination of an amine sulfonate and a particular carbonation technique can produce a product containing at least 47 percent dispersed barium carbonate.

U.S. Pat. Nos. 2,856,359 and 2,856,360 to Raymond C. Schlicht teach the use of amines as "promoters" in the preparation of superbasic alkaline earth metal sulfonates. While my process uses an amine it uses the amine to form an amine sulfonate and not as a promoter.

In addition to the Carlyle and Schlicht patents a search of the prior art produced the following U.S. patents: 2,433,243; 2,433,716; 2,472,152; 2,556,953; 2,582,192; 2,834,663; 3,010,897; 3,116,257; 3,198,613; 3,231,592; 3,272,605; 2,721,843; 2,989,387; 3,168,538; 3,198,815; 3,242,080 and 3,285,852. Inasmuch as none of these patents is considered to be as pertinent as the Carlyle or Schlicht patents, it is not necessary to discuss them.

It is well-known that diesel engines, and particularly diesel truck engines, under certain conditions emit substantial, and annoying quantities of black smoke. This black smoke is the result of incomplete combustion of the diesel fuel. More recently, the public and the government have become alarmed concerning air pollution. As a result, some states (e.g. California and Arizona) in this country impose substantial fines on truck operators whose trucks emit excessive black smoke. Furthermore, it is my understanding that in West Germany the government has instituted strict regulations, with accompanying heavy fines, concerning operation of diesel automotive engines.

In addition to engine design, one means of alleviating this problem is by the use of smoke suppressant additives in the diesel fuel. The product of my invention is particularly useful for such a purpose. My product is effective in substantially reducing smoke emission. Moreover, my product produces a friable deposit which disentegrates and passes out the exhaust system.

BRIEF SUMMARY OF MY INVENTION

In one aspect my invention relates to a composition of matter consisting essentially of a dispersion of barium carbonate in an amine salt of an oil-soluble organic acid, said composition having an unusually high concentration of barium carbonate while still having a low viscosity. For example, and not by way of limitation, I have prepared a composition containing about 32 percent by weight barium (—45.8% barium carbonate) which had a viscosity of 78 centistokes at 100° F.

In another aspect my invention relates to a process of preparing a barium-containing dispersion wherein the process comprises:

(a) forming an admixture consisting essentially of:
 (1) amine salt of an oil-soluble organic acid,
 (2) basic barium compound,
 (3) suitable alcohol,
 (4) nonvolatile diluent oil;
(b) carbonating the admixture of step (a); and
(c) removing any volatile materials present.

In a more suitable embodiment of this aspect, the process of preparing the barium-containing dispersion comprises:
 (a) Forming an admixture consisting essentially of:

(1) the reaction product of from about 0.6 to about 1 mole of an amine with about 1 mole of an oil-soluble organic acid (preferably a sulfonic acid),
(2) nonvolatile diluent oil,
(3) volatile process solvent,
(4) alcoholic solution of basic barium compound,
(5) small amount of water;

(b) Converting the basic barium compound to barium carbonate by means of a two-stage carbonation with carbon dioxide characterized in that (1) in the first stage from about 45 to about 90% of the barium is converted and (2) substantially less volatile material is present in the second stage than in the first stage,
(c) Removing any volatile materials present.

In a more preferred embodiment of this aspect, the process of preparing the barium-containing dispersion comprises:

(a) Forming an admixture consisting essentially of:

(1) the reaction product of at least about 0.6 mole of an amine with about 1 mole of an oil-soluble sulfonic acid,
(2) nonvolatile diluent oil,
(3) volatile process solvent,
(4) alcoholic solution of a basic barium compound,
(5) small amount of water.

(b) Passing carbon dioxide through the admixture of step (a), with about 60 to about 100% (by volume) of the volatile materials being still present, whereby from about 50 to about 85 percent of the barium is converted to barium carbonate.

(c) Removing volatile materials from the admixture of step (b) to the extent that from 0 to about 15% (by volume) of the volatile materials are still present.

(d) Passing carbon dioxide through the admixture whereby substantially all of the remaining barium is converted to barium carbonate and the residual volatile materials are removed.

In still another aspect my invention relates to a fuel composition for a diesel engine, said fuel composition consisting essentially of a major amount of a hydrocarbon diesel fuel and a minor, and effective, amount of a dispersion of barium carbonate in an amine salt of an oil-soluble organic acid, preferably a sulfonic acid.

In yet still another aspect my invention relates to an improved method of operating a diesel engine wherein the improvement comprises using a fuel composition consisting essentially of a major amount of a hydrocarbon diesel fuel and a minor, and effective, amount of a dispersion of barium carbonate in an amine salt of an oil-soluble organic acid, preferably a sulfonic acid.

DETAILED DESCRIPTION

*Materials used.*—Amines which are suitable for my invention are those having at least one hydrogen atom attached to the nitrogen. This restricts the amines to primary and secondary amines. In addition in order to be suitable the amine should have a molecular weight of at least about 100. Preferably the molecular weight is at least about 250. Examples of suitable amines include the following:

primary alkylamines, such as n-octylamine, n-decylamine, n-dodecylamine, methylheptylamine, tetradecylamine, hexadecylamine, octadecylamine.

secondary alkylamines, such as di-n-butylamine, di-sec-butylamine, di-iso-butylamine, dipentylamine, di-iso-pentylamine, di-n-heptylamine, di-n-octylamine, didecylamine, di-n-dodecylamine, dicyclohexylamine polyamines, such as hexamethylenetetramine, tetraethylpentamine, 1,6-hexanediamine tert. alkyl primary amines—these are primary amines in which the amino group is attached to a carbon atom on a highly branched chain—such as tert. octyl amine, tert. nonyl amine N-alkyl trimethylene diamines, wherein the alkyl group is derived from a fatty acid amines having the general formula:

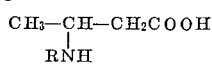

wherein R is an alkyl group derived from a fatty acid.

primary aromatic amines, such as alkylated anilines wherein at least one nuclear hydrogen atom is replaced by a $C_8$ to $C_{18}$ alkyl radical.

secondary aromatic amines, such as phenyl alpha-naphthylamine, diphenylamine primary alicyclic diamines, such as 1,8-diamino-p-menthane alkyl dimethylene diamines, wherein the alkyl group contains from 8 to 18 carbon atoms.

The preferred amines are those derived from fatty acids since many of these are commercially available and relatively inexpensive. Moreover, the primary and secondary alkylamines derived from fatty acids are particularly preferred in my invention. Several of these are described in the Kirk-Othmer "Encyclopedia of Chemical Technology," 2nd edition, vol. 2, pp. 134–135.

The more suitable oil-soluble organic acids are the sulfonic acids and carboxylic acids. The term "oil-soluble sulfonic acids," as used herein, refers to those materials wherein the hydrocarbon portion of the molecule has a molecular weight in the range of about 300 to about 1,000. Preferably, this molecular weight is in the range of about 370 to about 700. These oil-soluble sulfonic acids can be either synthetic sulfonic acids or the so-called mahogany or natural sulfonic acids. The term "mahogany sulfonic acid" is believed to be well understood, since it is amply described in the literature. The term "synthetic sulfonic acids" refers to those materials which are prepared by sulfonation of hydrocarbon feedstocks which are prepared synthetically. The synthetic sulfonic acids can be derived from either alkyl or alkaryl hydrocarbons. In addition, they can be derived from hydrocarbons having cycloalkyl (i.e., naphthenic) groups in the side chains attached to the benzene ring. The alkyl groups in the alkaryl hydrocarbons can be straight or branched chain. The alkaryl radical can be derived from benzene, toluene, ethyl benzene, xylene isomers, or naphthalene.

An example of a hydrocarbon feedstock which has been particularly useful in preparing synthetic sulfonic acids is a material known as postdodecylbenzene. Postdodecylbenzene is a bottoms product of the manufacture of dodecylbenzene. The alkyl groups of postdodecylbenzene are branched chain. Postdodecylbenzene consists of monoalkylbenzenes and dialkylbenzenes in the approximate mole ratio of 2:3 and has typical properties as follows:

| | |
|---|---|
| Specific gravity at 38° C. | 0.8649 |
| Average molecular weight | 385 |
| Percent sulfonatable | 88 |
| A.S.T.M. D–158 Engler: | |
| I.B.P., ° F. | 647 |
| 5° F. | 682 |
| 50° F. | 715 |
| 90° F. | 760 |
| 95° F. | 775 |
| F.B.P. ° F. | 779 |
| Refractive index at 23° C. | 1.4900 |
| Viscosity at: | |
| −10° C., centistokes | 2800 |
| 20° C., centistokes | 280 |
| 40° C., centistokes | 78 |
| 80° C., centistokes | 18 |
| Aniline point, ° C. | 69 |
| Pour point, ° F. | −25 |

An example of another hydrocarbon feedstock which is particularly useful in preparing synthetic sulfonic acids is a material referred to as "dimer alkylate." "Dimer alkylate" has branched chain alkyl groups as does postdodecylbenzene. Briefly described, dimer alkylate is prepared by the following steps:

(1) dimerization of a suitable feedstock, such as cat poly gasoline.
(2) alkylation of an aromatic hydrocarbon with the dimer formed in step (1).

Preferably, the dimerization step uses a Friedel-Crafts alkylation sludge as the catalyst. This process and the resulting product are described in application Ser. No. 367,417, filed May 14, 1964, and having the same assignee as the present application.

An example of another hydrocarbon feedstock which is particularly useful for preparing synthetic sulfonic acids which can be used in my invention is a material which I refer to as "NAB Bottoms." NAB Bottoms are predominantly di-n-alkyl aromatic hydrocarbon wherein the alkyl groups contain from 8 to 18 carbon atoms. They are distinguished primarily from the preceding sulfonation feedstocks in that they are straight chain and contain a large amount of di-substituted material. The process of preparing these materials and the resulting product are described in application Ser. No. 521,794, filed Jan. 20, 1966, and having the same assignee as the present application. Another process of preparing a di-n-alkaryl product is described in application Ser. No. 529,284, filed Feb. 23, 1966, and having the same assignee as the present application.

In order to make my disclosure even more complete, application Ser. Nos. 367,417, 446,661, and 446,720 are made a part of this disclosure.

The oil-soluble sulfonic acids are preferred for use in my process.

In addition to the sulfonic acids derived from the foregoing-described hydrocarbon feedstock, examples of other suitable sulfonic acids include the following: mono- and poly- wax-substituted naphthalene sulfonic acid, dinonyl naphthalene sulfonic acid, diphenyl ether sulfonic acid, naphthalene disulfide sulfonic acid, dicetyl thianthrene sulfonic acid, dialauryl beta-naphthol sulfonic acid, dicapryl nitronaphthalene sulfonic acid, unsaturated paraffin wax sulfonic acid, hydroxy substituted paraffin wax sulfonic acid, tetraamylene sulfonic acid, mono- and polychlorosubstituted paraffin wax sulfonic acid, nitrosoparaffin wax sulfonic acid; cycloaliphatic sulfonic acid such as lauryl-cyclohexyl sulfonic acid, mono- and poly-wax substituted cyclohexyl sulfonic acid, and the like.

Suitable carboxylic acids which can be used in preparing the colloidal dispersion used as a starting material include naphthenic acids, such as the substituted cyclopentane mono-carboxylic acids, the substituted cyclohexane monocarboxylic acids and the substituted aliphatic polycyclic monocarboxylic acids contains at least 15 carbon atoms. Specific examples include cetyl cyclohexane carboxylic acids, dioctyl cyclopentane carboxylic acids, dilauryl decahydronaphthalene and stearyloctahydro indene carboxylic acids and the like and oil-soluble salts thereof. Suitable oil-soluble fatty acids are those containing at least 8 carbon atoms. For producing the object of this invention in liquid form, I prefer fatty acids which are liquids at ambient temperatures down to about 15° C. Specific examples include 2-ethyl hexanoic acid, pelargonic acid, oleic acid, palmitoleic acid, linoleic acid and ricinoleic acid. Naturally occurring mixtures of predominantly unsaturated fatty acids, such as tall oil fatty acids, are particularly suitable.

A wide variety of nonvolatile diluent oils are suitable in the process of my invention. The principal requisite desired in the nonvolatile diluent oil is that it will act as a solvent for the dispersing agent which is used. Examples of nonvolatile diluent oils which can be used include mineral lubricating oils obtained by any of the conventional refining procedures; synthetic lubricating oils, such as polymers of propylene, polyoxyalkylenes, polyoxypropylene, dicarboxylic acid esters, and esters of acids of phosphorus; vegetable oils, such as corn oil, cotton seed oil, and castor oil; and animal oils, such as lard oil and sperm oil. Of the preceding examples of nonvolatile diluent oils, the mineral lubricating oils and the synthetic lubricating oils are considered more suitable, with the mineral lubricating oils being preferred.

While we have used the term "nonvolatile diluent oil" herein, other terms can be used (and have been used elsewhere) to describe these particular components in colloidal dispersions. For example, the terms "diluent oil" and "nonvolatile carrier" have been used.

It may be well to mention here that usually commercial sulfonic acids and sulfonates are not 100 percent acid of sulfonate. Instead, they are a mixture of sulfonic acids, or sulfonates with a nonvolatile diluent oil. For example, the term "40% active sulfonic acid" refers to a composition containing 40% sulfonic acid.

In the preferred embodiment of the process of my invention, it is desirable to use a process solvent. Such a material is used in order to reduce the viscosity of the admixture thereby obtaining better mixing of the materials. Examples of suitable process solvents include petroleum naphtha, hexane, heptane, octane, benzene, toluene, xylene, glycol ethers, and $C_1$–$C_6$ aliphatic monohydric alcohols. It should be emphasized that the type of process solvent is not an important feature of my process. Anyone skilled in this art and knowing the salient feature of my process can readily determine a suitable process solvent.

Suitable basic barium compounds for use in my process include barium oxide, barium hydroxide, and barium alcoholates derived from the alcohols described herein.

In one embodiment of the process of my invention the basic barium compound and the alcohol are added separately to the admixture. Preferably, in the process I use an alcoholic solution of the basic barium compound.

Alcohols which are suitable in my process are those in which the basic barium compound has an appreciable solubility. We have found suitable alcohols to be the following: aliphatic monohydric alcohols having from one to six carbon atoms, ether alcohols having the formula $ROCH_2CH_2OH$, wherein R is a $C_1$ to $C_6$ hydrocarbon group, and ether alcohols having the formula $HOCH_2CH_2OCH_2CH_2OR$, where R is a $C_1$ to $C_4$ hydrocarbon group.

Specific examples of suitable alcohols include methanol, ethanol, propanol, isopropanol, butanol, isobutanol, pentanol, hexanol, methoxy ethanol, ethoxy ethanol, propoxy ethanol, butoxy ethanol, monomethyl ether of diethylene glycol, and monoethyl ether of diethylene glycol.

The more suitable alcohols for use in my process are methanol methoxy ethanol, ethoxy ethanol, and propoxy ethanol.

*Amounts of materials used.*—The amounts of oil-soluble dispersing agent (i.e. amine sulfonate or carboxylate), nonvolatile diluent oil, and barium inorganic base are shown in the table below in parts by weight.

|  | Suitable | Preferred |
|---|---|---|
| Dispersing agent | 5–55 | 10–30 |
| Nonvolatile diluent oil | 15–85 | 20–70 |
| Basic compound (as barium) | 5–42 | 20–32 |

The minimum amount of water which should be present in conducting the process of my invention is about 0.25% by weight based on the barium. More suitably, the amount of water should be at least about 1% by weight based on the barium. Preferably, the amount of water should be at least 5% by weight based on the barium. When speaking of the amount of water I mean both added water and residual water present in the reactants, such as sulfonic acid and alcohol. The function of the water is unknown, but the desirability of having some water present has been demonstrated. For example, some water in the system is important in order to arrive at a final product having a suitable viscosity and appearance.

Inasmuch as the amount of process solvent is not important, can readily be determined by anyone skilled in this art, and is not present in the final product, it is not necessary to describe the amount here.

*Process conditions.*—In order to prepare compositions having a high barium content (e.g., above about 20%) I have found that it is necessary to employ a two-stage carbonation. For this reason it should be emphasized that when preparing compositions of high barium content the salient features of my process are the use of an admixture of amine and oil-soluble organic acid and the use of a two-stage carbonation. Preferably, I use a combination of both these features.

In my two-stage carbonation from about 45 to about 90% of the barium is converted to barium carbonate in the first stage, with substantially all of the remaining barium being converted to barium carbonate in the second stage. Preferably, from about 50 to about 85% of the barium is converted to barium carbonate in the first stage. More preferably, from about 60 to about 80% of the barium is converted to barium carbonate.

Moreover, while it is feasible to conduct the first-stage carbonation in the presence of all of the volatile materials present in the admixture, it is more suitable to conduct the first-stage carbonation after removing a portion of the volatile materials. Stated in another way, the first-stage carbonation suitably is conducted with from about 60 to about 100% of the volatile materials still present in the admixture. Preferably, the first-stage carbonation is conducted with from about 70 to about 95% of the volatile materials still present in the admixture.

Preferably, the second-stage carbonation is conducted after substantially all of the volatile materials have been removed, although it is suitable to conduct the second-stage carbonation with up to about 15% of the volatile materials still present. Stated in another way, the second-stage carbonation is conducted with from 0 to about 15% of the volatile materials being present. (It being understood that the term 0 in the preceding means substantially all of the volatile materials being removed. It being also understood that traces of the volatile materials can be present when we refer to 0%.)

I have used the term "two-stage carbonation" in the preceding since normally I use only two stages. Conceivably, more than two stages could be used. For this reason it is to be understood that any multi-stage process which accomplishes the same result as my two-stage process falls within the scope of this aspect of my invention.

The temperature to which the admixture is heated to remove the volatile materials prior to conducting the first-stage carbonation is dependent upon the nature of the volatile materials present in the admixture.

The carbonation temperature is not critical although for reasons of convenience the carbonation is usually conducted at the temperature employed to remove volatile materials and will therefore depend upon the particular solvent system. The particular temperature range used will also depend upon the desired barium content of the final product.

The temperature to which the admixture is heated in the final stage in order to remove the volatile materials is dependent upon the nature of the volatile materials present. As a matter of usual practice, and not by way of limitation, I usually heat to 150° C., since I have found that this removes substantially all of the volatile materials and still does not harm the product.

*Product of my invention.*—The product of my invention is a composition of matter consisting essentially of a dispersion of barium carbonate in an amine salt of an oil-soluble organic acid (preferably a sulfonic acid). In addition to these two components the composition of matter contains a nonvolatile diluent oil.

The product of my invention has the following characteristics:

(1) unusually high concentration of barium carbonate (i.e. high metal ratio)
(2) low viscosity both from a practical viewpoint and especially in view of the amount of barium carbonate present
(3) high barium carbonate content in view of amount of dispersing agent
(4) when used as an additive in diesel fuel it produces a friable deposit (in other words a deposit which flakes or disintegrates and can be carried out with the exhaust gases).

The amounts of oil-soluble dispersing agent (i.e. amine sulfonate or carboxylate), nonvolatile diluent oil, and barium carbonate in my product are shown in the table below in parts by weight:

|  | Suitable | Preferred |
| --- | --- | --- |
| Dispersing agent | 5–55 | 10–30 |
| Nonvolatile diluent oil | 15–85 | 20–60 |
| Barium carbonate | 5–60 | 30–50 |

Furthermore, preferably the product of my invention has a metal ratio of at least 5, more preferably of at least 10. Still further, the product of my invention can have a metal ratio of at least 14 while always having a viscosity below 1600 centistokes at 100° F., more usually below 800 centistokes at 100° F., and often below 400 centistokes at 100° F.

The term "metal ratio" as used herein is defined as the ratio of total amount of barium in the composition to the amount of barium theoretically combinable as a normal salt with the kind of organic acid present.

*Diesel fuel oil composition.*—In one aspect my invention relates to a diesel fuel oil composition comprising a major amount of a diesel fuel oil and an effective amount of a composition consisting essentially of amine salt of an organic acid, which is either a sulfonic acid or a carboxylic acid, nonvolatile diluent oil, and barium carbonate.

The amounts of these components which can be used in this aspect of my invention are shown in the table below in parts by weight:

|  | Suitable | Preferred |
| --- | --- | --- |
| Amine salt | 5–55 | 10–30 |
| Nonvolatile diluent oil | 15–85 | 20–60 |
| Barium carbonate | 2–60 | 30–50 |

The metal ratio in this aspect of my invention can be 0.5 or higher. Normally the higher metal ratios (e.g. 5–30) are preferred.

To my knowledge the prior art has not recognized that basic barium dispersions, using amine sulfonates or carboxylates as the dispersing agent, are superior to basic barium dispersions, using barium sulfonates as the dispersing agent, when used as an additive for diesel fuel oil compositions. For this reason, this aspect of my invention includes use of compositions having a metal ratio as low as 0.5 as additives for diesel fuel oil compositions.

The term "diesel fuel oil" as used herein includes straight-run or cracked petroleum distillates boiling in the range of about 325° F. to about 750° F.

The dispersion of barium carbonate is used in an amount of at least 0.05% (by volume), more suitably at least 0.25% (by volume) and preferably at least 0.50% (by volume). Due to the expense of using the material in a diesel fuel oil there is no need to state an upper limit on the amount. It is unlikely that the material will be used in an amount exceeding 2% by volume. Knowing that a dispersion of barium carbonate in an amine sulfonate or carboxylate is effective as an additive in diesel fuel oils anyone skilled in this art can readily determine the effective amount.

In considering this aspect of my invention it is to be understood that the amine sulfonates are the preferred dispersion agents.

In order to disclose the nature of the present invention still more clearly the following illustrative examples will be given. It is to be understood, however, that the invention is not to be limited to the specific conditions or details set forth in these examples except insofar as such limitations are specified in the appended claims. Parts given are parts by weight.

Example 1.—To a reaction vessel equipped with stirrer, thermometer and reflux condenser were charged 50 parts of sulfonic acid and 47.9 parts of 100 Pale Oil. The analysis of the sulfonic acid was as follows:

Total acidity—0.555 meq./g.
Sulfonic acidity—0.536 meq./g.
Combining weight (as acid)—450
Percent (wt.) nonvolatiles—44.7

The foregoing constituents were stirred and 8.9 parts of an n-alkyl trimethylene diamine (80% active) having a combining weight of 321 was added during a 28 minute period. After mixing the blend for an additional 17 minutes, the addition of 61.3 parts of barium methylate [1] was started. A total of 11 minutes elapsed during the addition of the barium methylate which contained 15.18% (wt.) barium. The vessel was then equipped with a glass sparger tube and $CO_2$ addition was started. After 33 minutes of carbonation, 3 cc. of water were added and external heat was applied to remove solvents. The flask contents reached 150° C. about 27 minutes after heating began. $CO_2$ addition was continued throughout the solvent removal. When cooled to room temperature, the product was fluid and had only a slight haze. The product weighed 91.4 grams and contained 10.2% (wt.) barium. (Metal ratio=5.1.)

Example 2.—To a 1 liter flask equipped with stirrer, thermometer and reflux condenser were charged 50 parts of sulfonic acid, 47.9 parts of 100 Pale Oil and 100 parts of methoxy ethanol. The analysis of the sulfonic acid was as follows:

Total acidity—0.659 meq./g.
Sulfonic acidity—0.636 meq./g.
Combining weight (as acid)—440
Percent (wt.) nonvolatiles—51.6

The foregoing constituents were stirred and 13.2 parts of an n-alkyl trimethylene diamine (80% active) having a combining weight of 400 was added during a 5 minute period. An amount of 230.6 parts of barium methylate, having a barium analysis of 15.18% (wt.) barium, was added during a 20 minute period. Water in the amount of 3.0 parts was then added followed by removal of overhead until the flask contents reached 85° C. With the flask contents at 85° C., sufficient $CO_2$ was added through a sparger tube to carbonate 62.4% of the available barium. The mixture was stripped to a temperature of 150° C. and $CO_2$ blowing was used to complete the carbonation of the remaining barium and to purge the remaining solvents. A bright fluid product weighing 131.5 grams was produced. The product had the following analysis:

Percent (wt.) barium _____ 24.8
Acetic Base No. _____ 227
Percent (wt.) $CO_2$ _____ 8.68
Vis. at 100° F. cs. _____ 924
Metal ratio (calculated from analysis) _____ 14.9

Example 3.—To a 1 liter flask equipped with stirrer, thermometer and reflux condenser were charged 50 parts of sulfonic acid as described in Example 2, 47.9 parts of 100 Pale Oil and 100 parts of methoxy ethanol. While stirring, 13.2 parts of an n-alkyl trimethylene diamine having a combining weight of 400 was added during a 5 minute period. An amount of 230.6 parts of barium methylate (percent Ba=15.18) was added during a 20 minute period. Solvents were removed by heating until the flask contents reached 85° C. At 85° C. sufficient $CO_2$ was added through a sparger to convert 85% of the available barium to $BaCO_3$. Additional external heat was then applied to remove solvents. When the flask contents reached 150° C. $CO_2$ blowing was restarted to complete carbonation of the barium and to purge solvents. The bright fluid product weighed 131.0 grams and had the following analysis:

Percent (wt.) barium _____ 24.73
Percent (wt.) $CO_2$ _____ 7.83
Vis. at 100° F. cs. _____ 763
Metal ratio (calculated) _____ 14.8

Example 4.—To a 1 liter flask equipped with stirrer, thermometer and reflux condenser were charged 50 parts of sulfonic acid as described in Example 2, 47.9 parts 100 Pale Oil, and 100 parts methoxy ethanol. While stirring, 10.77 parts of an amine composed predominantly of N-coco beta amino butyric acid was added to the reaction mixture during a 5 minute period. An amount of 164.7 parts of barium methylate (percent Ba=15.18) was then added during a 20 minute period. Addition of 30 parts of water followed the barium addition. External heating was started and solvents were removed until the flask contents reached 85° C. At 85° C. sufficient $CO_2$ was added to carbonate 62.4% of the barium present. Heating was then increased and the temperature of the flask contents was raised to 150° C. and solvents were removed. When the flask contents reached 150° C. $CO_2$ blowing was resumed to complete the carbonation of the barium and to purge solvents. The light amber, fluid product weighed 109.5 grams, possessed a slight haze, and had a metal ratio of 11.4.

Example 5.—The procedure of Example 4 was repeated with the exception that a t-alkyl primary amine, having a molecular weight of 315, was used as the amine. The bright fluid product weighed 116.0 grams.

Example 6.—The procedure of Example 4 was repeated with the exception that a t-alkyl primary amine, having a molecular weight of 191, was used as the amine. The product was bright and fluid and weighed 111.3 grams.

Example 7.—The procedure of Example 4 was repeated with the exception that an alkyl dimethylene diamine, having a molecular weight of 285, was used as the amine. The product was bright and fluid and weighed 115.9 grams.

Example 8.—The procedure of Example 4 was repeated with the exception that 1,8-diamino-p-menthane, a primary alicyclic diamine, was used as the amine. The product was fluid, had a slight haze and weighed 112 grams.

Example 9.—To a 1 liter flask equipped with stirrer, thermometer and reflux condenser were charged 50 parts of sulfonic acid, 47.9 parts 100 Pale Oil and 100 parts of methoxy ethanol. The analysis of the sulfonic acid was as follows:

Total acidity—0.494 meq./g.
Sulfonic acidity—0.488 meq./g.
Combining weight (as acid)—428
Percent (wt.) nonvolatiles—32.7

While stirring, 0.94 part of tetraethylene pentamine was added to the reaction mixture. An amount of 103.3 parts of barium alcoholate derived from methoxy ethanol (percent Ba=24.2) was added during a 20 minute period, and 3.0 parts of water were added after the barium. External heat was applied to remove solvents until the flask contents reached 85° C. With the reactants at 85° C., 5.63 parts of Dry Ice were allowed to vaporize and $CO_2$ generated from the vaporization was passed through a sparger into the reaction vessel. Additional solvents were removed by heating the reaction mixture to 150° C. When the flask contents reached 150° C., $CO_2$ blowing was resumed to complete the carbonation of the barium and to purge solvents. The product was bright and fluid at 150° C., weighed 99.1 grams, and had a metal ratio of 14.9.

Example 10.—To a 1 liter flask equipped with stirrer, thermometer and reflux condenser were charged 50 parts of sulfonic acid, 47.9 parts 100 Pale Oil and 100 parts

---

[1] The term "barium methylate" as used in the examples refers to a methanolic solution of barium oxide.

methoxy ethanol. The analysis of the sulfonic acid was as follows:

Total acidity—0.507 meq./g.
Sulfonic acidity—0.496 meq./g.
Combining weight (as acid)—424
Percent (wt.) nonvolatiles—33.9

While stirring, 10.14 parts of an n-alkyl trimethylene diamine having a combining weight of 400 was added during a 5 minute period. Barium methoxy ethanolate (167.4 parts—percent Ba=23.9) was then added during a 20 minute period, and 3.0 parts of water was added after the barium. External heat was applied and solvents were removed until the reaction mass reached 85° C. At 85° C., sufficient $CO_2$ was added through a sparger to carbonate 62.4% of the available barium. Additional heat was applied and solvents were removed until the reaction mass reached 150° C. $CO_2$ blowing was resumed at 150° C., to complete carbonation of barium and to purge solvents. The product was bright and fluid and weighed 132.4 grams. The product contained 30.25% (wt.) barium (metal ratio=23.5) and had a viscosity of 211 cs. at 100° F.

Example 11.—To a stirred reaction vessel were charged 500 parts of sulfonic acid (as described in Example 9), 480 parts 100 Pale Oil, and 1000 parts of methoxy ethanol. While stirring, 74 parts of a primary alkyl amine having a combining weight of 298 was added during about 6 minutes. Barium methoxy ethanolate (1855 parts—percent Ba=24.26) was then added during about 20 minutes. The barium addition was immediately followed by the addition of 30 parts of water during about 3 minutes. The reaction mass was heated, solvents were removed overhead and the temperature of the reaction mass was raised to 85° C. With the temperature at 85° C., $CO_2$ was passed into the reaction mixture by allowing 101 parts of Dry Ice to vaporize and the gas was passed through a sparger. After $CO_2$ addition was complete, additional heat was applied, solvents were removed and the temperature of the reaction mass was raised to 145° C. At this point, solvent removal was stopped and $CO_2$ blowing was resumed to complete carbonation of barium. Solvents were refluxed during about 1 to 2 hours of $CO_2$ blowing. Additional solvent was then removed and the reaction mass was heated to about 150° C. A weight of 1411 grams of bright fluid product were then polish filtered through filter aid. The product contained approximately 32% (wt.) barium, and had a metal ratio of 26.9.

Example 12.—To a reaction vessel equipped with stirrer, thermometer and reflux condenser were charged 25 parts of sulfonic acid, 53.5 parts of 100 Pale Oil, 50 parts of hexane and 172 parts methoxy ethanol. The analysis of the sulfonic acid was as follows:

Total acidity—1,100 meq./g.
Sulfonic acidity—1.074 meq./g.
Combining weight (as acid)—435
Percent (wt.) nonvolatiles—47.1

The foregoing constituents were stirred and 8.27 parts of a primary alkyl amine having a combining weight of 298 was added during a 3 minute period. Technical grade barium oxide (25 parts) was then added and the reaction mixture was heated and held at reflux temperature for 30 minutes. Following this, the reactants were cooled slightly and 3.0 parts of water were added. External heat was reapplied and overhead solvents were removed until the flask contents reached 100° C. At 100° C., 5.7 parts of $CO_2$ was added during a period of 35 minutes. Additional overhead solvents were then removed until the flask contents reached 150° C. $CO_2$ blowing was restarted when the reaction mixture reached 140° C., and it was continued to complete carbonation of available barium and to purge solvents. The 104.4 grams of fluid product filtered very rapidly through Hyflo filter aid. The filtrate was bright, fluid and contained 20.19% (wt.) barium by analysis. (Metal ratio=26.9.)

Example 13.—To a reaction vessel equipped with stirrer, thermometer, and reflux condenser were charged 21.2 g. Crofatol 5 (a tall oil fatty acid, Arizona Chemical Company, total acidity=3.358 meq./gm.), 68.9 g. 100 Pale Oil, 54.0 g. hexane, and 242.4 g. methoxy ethanol. The foregoing were stirred and 23.0 g. of a primary alkyl amine having a combining weight of about 298 was added. The addition of 114.2 g. of a methoxy ethanolic solution of barium methoxy ethanolate (percent Ba=24.01) was made, and the 38.5 g. of overhead was removed by heating. Seven grams of water were added, and the vessel was then equipped with a glass sparger tube and 6.3 g. of $CO_2$ was added. $CO_2$ addition was stopped and an additional 200 g. of overhead solvent was removed. $CO_2$ addition was restarted and overhead removal continued. The flask contents were heated to 150° C. and held at that temperature until all overhead was removed and excess $CO_2$ had been added. When cooled to room temperature, the 151.4 g. of product was bright and fluid. It contained 18.1% barium (calc.) and had a metal ratio of 5.6.

The following examples illustrate the use of an amine salt of an organic acid and the use of 2-stage carbonation in the preparation of products having a very high barium content.

Example 14.— To a 5-liter reaction vessel equipped with stirrer, thermometer and reflux condenser were charged 275 g. sulfonic acid, 344.6 g. diluent oil, 269.8 g. hexane and 1212.2 g. methoxy ethanol. The analysis of the sulfonic acid was as follows:

Total acidity—0.648 meq./g.
Sulfonic acidity—0.648 meq./g.
Combining weight (as acid)—424
Percent (wt.) nonvolatiles—35.7

The foregoing constituents were stirred and 57.3 g. of a primary alkyl amine was added. A weight of 1161.4 g. of (23.6% (wt.) barium) was then added. Solvents were removed to a flask temperature of 100° C. and then 30 g. of water was added to the reaction mixture. Following the water addition, 62.4 g. of $CO_2$ was added during a 50-minute period. After removing an additional 1202 g. of solvent, $CO_2$ blowing was restarted and continued during the remaining solvent removal. The product was bright and fluid and weighed 910 g. It contained 29.8% (wt.) barium and had an acetic base number of 247.

Example 15.—The process of Example 14 was repeated but with a change in the carbonation step. Instead of using 62.4 g. of $CO_2$ following the water addition, the reaction mixture was blown with $CO_2$ until the carbonation was complete and the reaction mixture tested acidic to α-naphthol benzein indicator. The resulting 890 g. of product had a slate gray appearance and the consistency of a grease.

Example 16.—The process of Example 14 was repeated except no amine was used. The resulting 858 g. of product had a grainy appearance and the consistency of a stiff grease.

Example 17.—To further demonstrate the useful properties of the composition of this invention No. 2 diesel fuel was treated with a product as described in Example 11. The additive was blended in the fuel in an amount to provide 5.305 grams of barium per gallon of fuel. A 2-cycle GM diesel engine was equipped so that it could be run alternately on base fuel and on treated fuel. Smoke levels were recorded on a moving tape through which a controlled volume of exhaust was passed. Visual smoke ratings were assigned using a scale known to the trade as the Bacharach oil burner smoke scale. Ratings from the Bacharach scale can range from zero to nine. A white filter paper corresponds to a zero rating or no smoke. A dark grey, almost black, filter paper corresponds to a nine rating, or heavy smoke, on the Bacharach scale. The effectiveness of the practice of the invention as described in Example 11 can be seen by the following smoke ratings:

| Fuel description (all blends contain No. 2 diesel fuel) (listed in sequence tested) | GM diesel cylinder numbers | | |
|---|---|---|---|
| | No. 1 Smoke ratings | No. 2 Smoke ratings | No. 3 Smoke ratings |
| Without additive | 5½ | 5½ | 7 |
| With additive | 3 | 3 | 4 |
| Without additive | 5½ | 5½ | 7 |
| Do | 5 | 5 | 7 |
| With additive | 2 | 2 | 3 |
| Without additive | 6 | 6 | 7 |

The effectiveness of the additive in suppressing diesel exhaust smoke is obvious.

The invention having thus been described, what is claimed and desired to be secured by Letters Patent is:

1. A process for preparing a barium-containing dispersion, said dispersion having a metal ratio (as barium) of at least 5 while having a viscosity below 1600 centistokes at 100° F., said process comprising:
    (a) forming an admixture consisting essentially of:
        (i) about 5 to about 55 parts by weight of an amine salt of an oil-soluble sulfonic acid, said amine having a molecular weight of at least 100 and being primary or secondary,
        (ii) about 5 to about 42 parts by weight, as barium, of a basic barium compound selected from the group consisting of barium oxide or barium hydroxide,
        (iii) an alcohol selected from the group consisting of aliphatic alcohols containing from 1 to 5 carbon atoms and ether alcohols containing up to 8 carbon atoms,
        (iv) about 15 to about 85 parts by weight nonvolatile diluent oil.
    (b) passing carbon dioxide through the admixture of step (a) until the basic barium compound is substantially converted to barium carbonate, and
    (c) removing any volatile materials present.

2. A process for preparing a barium-containing dispersion, said dispersion having a metal ratio (as barium) of at least 5 while having a viscosity below 1600 centistokes at 100° F., said process comprising:
    (a) forming an admixture consisting essentially of:
        (i) about 5 to about 55 parts by weight of an amine salt of an oil-soluble sulfonic acid, said amine having a molecular weight of at least 100 and being primary or secondary,
        (ii) an alcoholic solution of barium oxide or barium hydroxide wherein the alcohol is selected from the group consisting of aliphatic alcohols containing from 1 to 5 carbon atoms and ether alcohols containing up to 8 carbon atoms, said alcoholic solution containing from about 5 to about 42 parts by weight barium,
        (iii) about 15 to about 85 parts by weight nonvolatile diluent oil.
    (b) passing carbon dioxide through the admixture until substantially all of the basic barium compound is converted to barium carbonate, and
    (c) removing any volatile materials present.

3. A process for preparing a barium-containing dispersion, said dispersion having a metal ratio (as barium) of at least 5 while having a viscosity below 1600 centistokes at 100° F., said process comprising:
    (a) forming an admixture consisting essentially of:
        (i) about 5 to about 55 parts by weight of the reaction product of at least about 0.6 mole of an amine, said amine having a molecular weight of at least 100 and being either primary or secondary, with about 1 mole of an oil-soluble organic acid, selected from the group consisting of sulfonic acids and carboxylic acids,
        (ii) about 15 to about 85 parts by weight nonvolatile diluent oil,
        (iii) process solvent,
        (iv) an alcoholic solution of barium oxide or barium hydroxide wherein the alcohol is selected from the group consisting of aliphatic alcohols containing from 1 to 5 carbon atoms and ether alcohols containing up to 8 carbon atoms, said alcoholic solution containing from about 5 to about 42 parts by weight barium,
        (v) at least 0.25 percent by weight water, based on the barium,
    (b) removing a portion of the volatile materials by heating the admixture,
    (c) passing carbon dioxide through the admixture whereby from about 45 to about 90 percent of the basic barium compound is converted to barium carbonate,
    (d) removing substantially all of the remaining volatile materials by heating the admixture, and
    (e) passing carbon dioxide through the admixture whereby substantially all of the remaining basic compound is converted to barium carbonate and the residual volatile materials are removed.

4. The process of claim 3 characterized further in that the oil-soluble organic acid is a carboxylic acid.

5. The process of claim 4 characterized further in that the nonvolatile diluent oil is selected from the group consisting of mineral lubricating oils and synthetic lubricating oils.

6. The process of claim 5 characterized further in that the amine has a molecular weight of at least 250 and is selected from the group consisting of primary alkylamines, secondary alkylamines, polyamines, tertiary alkyl primary amines, N-alkyl trimethylene diamines, wherein the alkyl group is derived from a fatty acid, amines having the formula

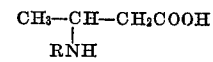

wherein R is an alkyl group derived from a fatty acid, primary aromatic amines, secondary aromatic amines, primary alicyclic diamines, and alkyl dimethylene diamines.

7. The process of claim 6 characterized further in that the process solvent is selected from the group consisting of petroleum naphtha, hexane, heptane, octane, benzene, toluene, xylene, and ether alcohols containing up to 8 carbon atoms.

8. The process of claim 7 wherein the alcohol of step (a) (v) is an aliphatic alcohol containing from 1 to 3 carbon atoms.

9. The process of claim 8 wherein the alcohol is methanol.

10. The process of claim 9 wherein the alcohol of step (a) (iv) is an ether alcohol containing up to 8 carbon atoms.

11. The process of claim 10 wherein the alcohol is a monoether alcohol containing less than 5 carbon atoms.

12. The process of claim 3 characterized further in that the oil-soluble organic acid is a sulfonic acid.

13. The process of claim 12 wherein the nonvolatile diluent oil is selected from the group consisting of mineral lubricating oils and synthetic lubricating oils.

14. The process of claim 13 wherein the amine has a molecular weight of at least 250 and is selected from the group consisting of primary alkylamines, secondary alkylamines, polyamines, tertiary alkyl primary amines, N-alkyl trimethylene diamines, wherein the alkyl group is derived from a fatty acid, amines having the formula

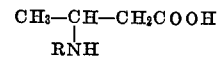

wherein R is an alkyl group derived from a fatty acid, primary aromatic amines, secondary aromatic amines, primary alicyclic diamines, and alkyl dimethylene diamines.

15. The process of claim 14 wherein the process solvent is selected from the group consisting of petroleum naphtha, hexane, heptane, octane, benzene, toluene, xylene, and ether alcohols containing less than 8 carbon atoms.

16. The process of claim 15 wherein the alcohol of step (a) (iv) is an aliphatic alcohol containing from 1 to 3 carbon atoms.

17. The process of claim 16 wherein the alcohol is methanol.

18. The process of claim 17 wherein the alcohol is a monoether alcohol containing less than 5 carbon atoms.

19. The process of claim 18 wherein the alcohol is methoxy ethanol.

20. The process of claim 3 wherein
(a) the amine is a primary alkylamine derived from a fatty acid,
(b) the oil-soluble organic acid is a sulfonic acid,
(c) the nonvolatile diluent oil is a mineral lubricating oil,
(d) the process solvent is hexane, and
(e) the alcohol of step (a) (iv) is methoxy ethanol.

21. The product prepared by the process of claim 1.
22. The product prepared by the process of claim 3.
23. The product prepared by the process of claim 20.
24. A diesel engine fuel composition consisting essentially of a major amount of a hydrocarbon diesel fuel and an effective amount in the range of from about 0.05 to about 2 weight percent of the product prepared by the process of claim 1.
25. A diesel engine fuel composition consisting essentially of a major amount of a hydrocarbon diesel fuel and an effective amount in the range of from about 0.05 to about 2 weight percent of the product prepared by the process of claim 3.

References Cited

UNITED STATES PATENTS

| 2,861,951 | 11/1958 | Carlyle | 252—33 |
| 3,021,280 | 2/1962 | Carlyle | 252—33 |
| 3,085,866 | 4/1963 | Gay et al. | 44—57 |
| 3,410,670 | 11/1968 | Le Suer | 44—57 |
| 3,451,931 | 6/1969 | Kahn et al. | 252—18 X |

DANIEL E. WYMAN, Primary Examiner

W. J. SHINE, Assistant Examiner

U.S. Cl. X.R.

44—71, 57, 68, 72, 76

UNITED STATES PATENT OFFICE
CERTIFICATE OF CORRECTION

Patent No. 3,525,599    Dated August 25, 1970

Inventor(s) Gerald L. Nield

It is certified that error appears in the above-identified patent and that said Letters Patent are hereby corrected as shown below:

Column 2, line 42, "78" should be -- 758 -- .
Column 14, line 22, after basic should be -- barium -- .
Column 14, line 55, "9" should be -- 7 --.

SIGNED AND
SEALED
NOV 24 1970

(SEAL)
Attest:

Edward M. Fletcher, Jr.
Attesting Officer

WILLIAM E. SCHUYLER, JR.
Commissioner of Patents